United States Patent
Liang (10) Patent No.: US 9,323,724 B2
(45) Date of Patent: Apr. 26, 2016

(54) WEBPAGE SKIN REPLACEMENT METHOD, APPARATUS, AND MOBILE TERMINAL

(71) Applicant: Jie Liang, Guangzhou (CN)

(72) Inventor: Jie Liang, Guangzhou (CN)

(73) Assignee: GUANGZHOU UCWEB COMPUTER TECHNOLOGY CO., LTD, Guangzhou (CN)

(*) Notice: Subject to any disclaimer, the term of this patent is extended or adjusted under 35 U.S.C. 154(b) by 71 days.

(21) Appl. No.: 13/825,977

(22) PCT Filed: Sep. 24, 2012

(86) PCT No.: PCT/CN2012/081842
§ 371 (c)(1),
(2) Date: Mar. 26, 2013

(87) PCT Pub. No.: WO2013/149455
PCT Pub. Date: Oct. 10, 2013

(65) Prior Publication Data
US 2014/0095977 A1   Apr. 3, 2014

(30) Foreign Application Priority Data

Apr. 5, 2012 (CN) .......................... 2012 1 0100493

(51) Int. Cl.
G06F 17/00 (2006.01)
G06F 17/21 (2006.01)
(Continued)

(52) U.S. Cl.
CPC ............ *G06F 17/211* (2013.01); *G06F 3/0481* (2013.01); *G06F 9/4443* (2013.01); *G06F 17/218* (2013.01); *G06F 17/2247* (2013.01); *H04N 1/00501* (2013.01)

(58) Field of Classification Search
CPC . G06F 17/218; G06F 17/211; G06F 17/2247; G06F 3/0481; H04N 1/00501

USPC .......................................... 715/204, 234, 235
See application file for complete search history.

(56) References Cited

U.S. PATENT DOCUMENTS 6,732,332 B1 * 5/2004 Borysewicz .......... G06F 17/218
707/999.102
8,225,198 B2 * 7/2012 Hanechak ........... G06F 17/2229
715/240

(Continued)

FOREIGN PATENT DOCUMENTS

CN       1987854 A    6/2007
CN     102209147 A    5/2011

(Continued)

OTHER PUBLICATIONS

Branwyn, Gareth, "Mosaic Quick Tour for MAC: Accessing & Navigating the Internet's World Wide Web", Ventura Press, 1994, pp. 1-2, 5-7, 11-26, 52-59, 61-64, 91-112 (55 pages total).*

(Continued)

Primary Examiner — Cesar Paula
Assistant Examiner — David Faber
(74) Attorney, Agent, or Firm — Anova Law Group, PLLC (57) ABSTRACT

This invention provides a skin replacement method for a webpage content area displayed in a mobile terminal browser, including: parsing each element of webpage content received, determining whether a self-defined extension property exists in an element for indicating skin style information of the element. The self-defined extension property is predefined by a browser client and provided for a web server, and a value of the self-defined extension property represents index information of the skin style information of the element in a skin style library of the browser client; when the self-defined extension property exists, based on the index information, searching the skin style information corresponding to the index information in the skin style library; and rendering the element based on found skin style information. This method can directly and seamlessly integrate skin effect of the browser client into the webpage content displayed in the browser, providing better use experience.

17 Claims, 5 Drawing Sheets

(51) Int. Cl.
  *G06F 3/0481* (2013.01)
  *H04N 1/00* (2006.01)
  *G06F 17/22* (2006.01)
  *G06F 9/44* (2006.01)

(56) References Cited

U.S. PATENT DOCUMENTS

| | | | | |
|---|---|---|---|---|
| 2005/0050002 | A1* | 3/2005 | Slotznick | G06F 17/22 |
| 2005/0066270 | A1* | 3/2005 | Ali | G06F 8/38 |
| | | | | 715/236 |
| 2008/0297521 | A1* | 12/2008 | Chi | G06F 17/248 |
| | | | | 345/501 |
| 2009/0031225 | A1 | 1/2009 | Toebes et al. | |
| 2010/0332969 | A1* | 12/2010 | Jayaraman | G06F 17/30905 |
| | | | | 715/234 |
| 2012/0278700 | A1* | 11/2012 | Sullivan | G06F 17/218 |
| | | | | 715/235 |
| 2013/0042188 | A1* | 2/2013 | Dobronsky | G06F 3/04817 |
| | | | | 715/760 |
| 2013/0132857 | A1* | 5/2013 | Shapiro | H04L 63/1483 |
| | | | | 715/744 |
| 2013/0145256 | A1* | 6/2013 | Padala | G06F 17/218 |
| | | | | 715/235 |
| 2013/0212469 | A1* | 8/2013 | Tian | G06F 17/30905 |
| | | | | 715/236 |
| 2015/0074561 | A1* | 3/2015 | Zhou | G06F 9/4443 |
| | | | | 715/760 |

FOREIGN PATENT DOCUMENTS

| | | |
|---|---|---|
| CN | 102360293 A | 2/2012 |
| CN | 102662672 A | 12/2012 |

OTHER PUBLICATIONS

Bewick, Chris, "HTML5 Custom Data Attributes (data-)", May 27, 2010, HTML5Doctor, 3 pages. http://html5doctor.com/html5-custom-data-attributes/.*

BebenKoben, "The <b: section> and <b: skin> Template Blogspot", Feb. 12, 2011, 8 pages http://beben-koben.blogspot.com/2011/02/tag-and-template-blogspot.html.*

* cited by examiner

WEBPAGE SKIN REPLACEMENT METHOD, APPARATUS, AND MOBILE TERMINAL

TECHNOLOGY FIELD

The present invention relates to the field of mobile communications and, more particularly, to a webpage skin replacement method, apparatus, and mobile terminal.

BACKGROUND

With the development of technology, web browsing by a mobile terminal is becoming a trend. When browsing a webpage, first, a browser installed on a mobile terminal client sends a page content request to a web server. The web server responds to the page content request and sends the requested webpage content to the client. Then, the browser renders the requested webpage content on the client to be browsed by the user.

In order to provide better browsing experience for users, many browsers provide a skin replacement functionality (or theme-switching functionality), that is, the skin of the display in the browser is replaced by a set of users' favorite skin, resulting in better use experience for users. However, the skin replacement functionality is usually applied only in the browser's own user interface (UI) widgets (for example, title bar, toolbar, menu bar, and so on), that is, it is applied to the shell part of the browser, and cannot be applied to a specific webpage part, such as the current webpage content displayed in the browser. Therefore, after a skin is replaced, although the shell part of the browser looks very nice, the webpage content displayed in the browser will still remain in the original skin, which greatly affects the overall aesthetic appearance, resulting in a negative impact on use experience.

Therefore, there is a growing need to develop a method which can seamlessly integrate browser skin effect into webpage content.

SUMMARY OF THE INVENTION

In view of the above problems, a purpose of the present invention is to provide a skin replacement method for a webpage content area displayed on a browser of a mobile terminal. Using this method, browser skin effect can be integrated seamlessly to the webpage content, which makes the shell part of the browser and the webpage content a unified and desired overall appearance, thus providing better use experience for users.

Another purpose of the present invention is to provide a skin replacement apparatus for the webpage content area displayed in the browser of a mobile terminal and a mobile terminal having the above described apparatus.

According to one aspect of the present invention, a skin replacement method for the webpage content area displayed in the browser of mobile terminal is provided, comprising: parsing each element of webpage content received from a web server; determining whether a self-defined extension property exists in an element for indicating skin style information of the element. The self-defined extension property is predefined by a browser client and provided for the web server to be added to the element when the element is created, and a value of the self-defined extension property represents index information of the skin style information of the element in a skin style library of the browser client; when it is determined that the self-defined extension property exists in the element, based on the index information, searching the skin style information corresponding to the index information in the skin style library; and rendering the element based on found skin style information from skin style library.

In one or more embodiments of the above aspects, parsing each element of the webpage content received from the web server includes parsing source code of each element of the webpage content received from the web server, and determining if the self-defined extension property that indicates the skin style information of the element exists in the source code of the element.

In one or more embodiments of the above aspects, the skin style information corresponding to the index information may be pre-stored with associated index information in the skin style library of the browser client, or may be added to the skin style library of the browser client from the web server through a special interface provided by the browser client.

In one or more embodiments of the above aspects, the self-defined extension property is a self-defined CSS property or self-defined HTML element property.

In one or more embodiments of the above aspects, if there is no self-defined extension property or no corresponding skin style information found in the skin style library of a browser client based on the index information, the browser client renders the element based on original style information in the webpage content.

According to another aspect of the present invention, a skin replacement apparatus for the webpage content area displayed on a browser of a mobile terminal is provided, comprising: a parsing unit is used to parse each element of the webpage content received from a web server, and to determine whether a self-defined extension property exists in an element for indicating skin style information of the element. The self-defined extension property is predefined by a browser client and provided for the web server to be added to the element when the element is created, and a value of the self-defined extension property represents the index information of the skin style information of the element in a skin style library of the browser client; a searching unit configured to, after the self-defined extension property is determined, based on the index information representing the value of the self-defined extension property, search the skin style information corresponding to the index information in the skin style library of the browser client; a rendering unit configured to render the element based on found skin style information by searching unit.

In one or more embodiments of the above aspects, the parsing unit is configured to parse the source code of each element of the webpage content received from the web server, and determine if the self-defined extension property that indicates the skin style information of the element exists in source code of the element.

In one or more embodiments of the above aspects, the skin style information corresponding to the index information may be pre-stored with associated index information in the skin style library of the browser client, or may be added to the skin style library of the browser client from the web server through the special interface provided by the browser client.

In one or more embodiments of the above aspects, the rendering unit is also configured to render the element based on original style information in the webpage content if there is no self-defined extension property or no corresponding skin style information found in the skin style library of a browser client based on the index information.

According to another aspect of the present invention, a mobile terminal including the above described apparatus is provided.

According to the present invention, a skin replacement method and apparatus for the webpage content area displayed on a browser of the mobile terminal can directly and seamlessly integrate skin effect of the browser client into the webpage content displayed in the browser. The display effect of the web content can switch dynamically with the skin switching of the browser, and makes skin effect for the whole browser more aesthetic, thus providing better use experience for users.

In order to achieve the above and other related objectives, one or more aspects of the present invention include those features to be described in detail as follows and particularly pointed out in the claims. The following descriptions and accompanying drawings describe in detail certain illustrative aspects of the present invention. However, these aspects only illustrate some of the ways in which the principle of the present invention may be used. In addition, the present invention intends to include all these aspects and their equivalents.

BRIEF DESCRIPTION OF THE DRAWINGS

By referring to the detailed descriptions of the accompanying drawings, the above and other objectives, features and advantages of the present invention will be clearer and easily understood. In the drawings.

The same label may be used in all drawings to indicate similar or corresponding features or functions.

DETAILED DESCRIPTIONS

Individual embodiments of the present invention will now be described in detail in reference to the accompanying drawings.

Figure 1:
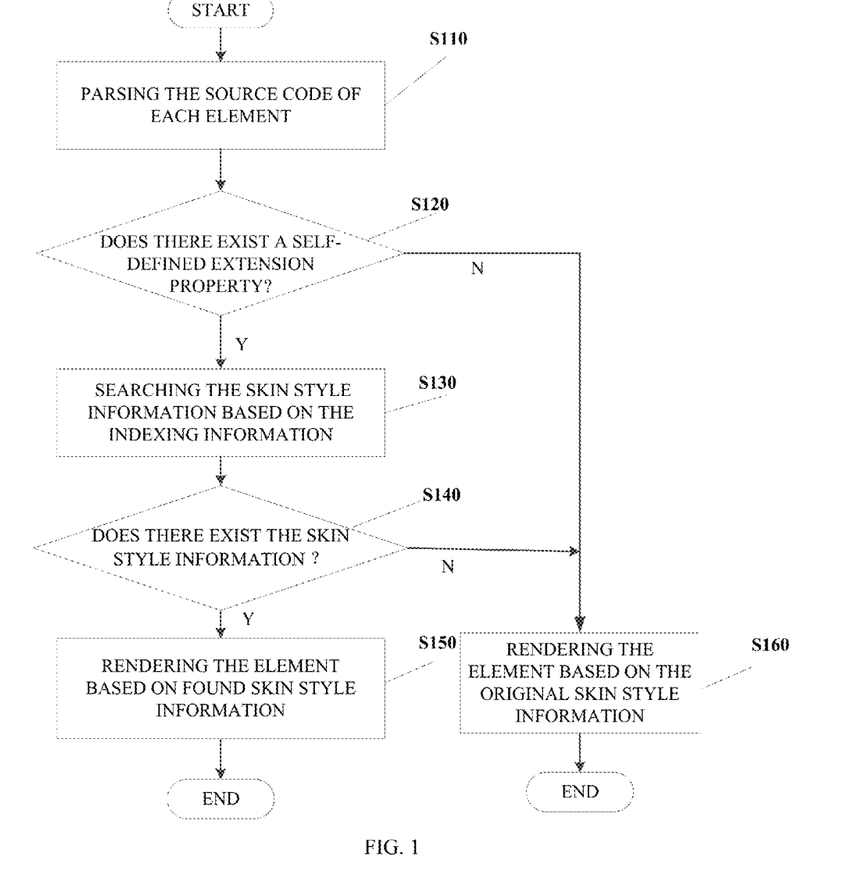
FIG. 1 shows a flow chart of a skin replacement method for a webpage content area displayed on a browser of mobile terminal according to the present invention.

FIG. 1 shows a flow chart of a skin replacement method for the webpage content area displayed on a browser of mobile terminal according to the present invention.

As shown in FIG. 1, when a mobile device client receives web content from a web server, at the beginning, parsing each element of webpage content received from the web server (step S110), and determining if a self-defined extension property that indicates skin style information of the element exists in the element (step S120). For example, the source code of each element of the webpage content received from the web server is parsed, so as to determine if the self-defined extension property that indicates the skin style information of the element exists in the source code of the element. As used herein, a self-defined extension property refers to a property predefined by a browser client and provided in advance to the web server, such as providing to the web server in the prescribed manner. Therefore, on the web server, when writing the source code of the webpage content, web content writers can add the self-defined extension property in the source code of the element in the prescribed manner. In addition, the value of the self-defined extension property may represent the index information of the skin style information of the element in the skin style library of the browser client. As an example, the self-defined extension property could be a self-defined Cascading Style Sheet (CSS) property or Hypertext Markup Language (HTML) element property.

For example, the self-defined extension property is self-defined CSS property "-uc-skin". A value of the self-defined extension property is a string, which represents the index information of the skin style information of the element in the skin style library of the browser client, such as "news.title", i.e., the title of the news. Using the above definition, when writing the source code of the webpage content, web content writers may add the following source code to the source code of the element:

```
<div style="-uc-skin:'news.title';">...</div>
or
<style>
#news_title {-uc-skin:"news.title"; }
</style>
<p id="news_title"> ... </div>
``` or, the self-defined extension property is self-defined HTML element property "-uc-skin". A value of the self-defined extension property is a string, which represents the index information of the skin style information of the element in the skin style library of the browser client, such as "news-.title", i.e., the title of the news. Using the above definition, when writing the source code of the webpage content, web content writers may add the following source code to the source code of the element:

<div uc-skin="news.title"> . . . </div>

In this example, the skin style information corresponding to the index information may be pre-stored with associated index information in the skin style library of a browser client. Or, the skin style information corresponding to the index information may be added to the skin style library of the browser client by web content writers through a special interface provided by the browser client. There are many methods to define the format and the interface of the skin style library, such as using ordinary configuration files or XML files, etc., to define them. As an example, China patent application no. 201210049001.6, filed on Feb. 28, 2012, entitled "widget context display method, widget context display apparatus and mobile terminal" gives a specific implementation method. The entire contents of all of the above application are incorporated herein by reference.

When it is determined that there exists a self-defined extension property as described, the process goes to step S130. Otherwise, the process goes to step S160.

In step S130, based on the index information represented by self-defined extension property value, searching the skin style information corresponding to the index information in the skin style library of the browser client. For example, when the self-defined extension property is CSS property, if the browser client parses CSS property -uc-skin, the browser client searches the skin style information corresponding to the index information as "news.title" from its own skin style library. Or, when the self-defined extension property is HTML element property, if the browser client parses HTML element property uc-skin, the browser client searches the skin style information corresponding to the index as "news.title" from own skin style library.

If the corresponding style information is found in the skin style library of the web browser client, that is, the result of the judgment of step S140 is yes, in step S150, rendering the element based on found skin style information. For example, if the skin style information corresponding to the index as "news.title" is found in the skin style library of the web browser client, the browser client renders the element based on found skin style information.

If the corresponding style information is not found in the skin style library of the web browser client, that is, the result of the judgment of step S140 is no, in step S160, the browser client renders the element based on the original skin style information.

These steps from S110 to S160 can be repeated until the process as described above is completed for all elements in the current webpage content.

Figure 2A:
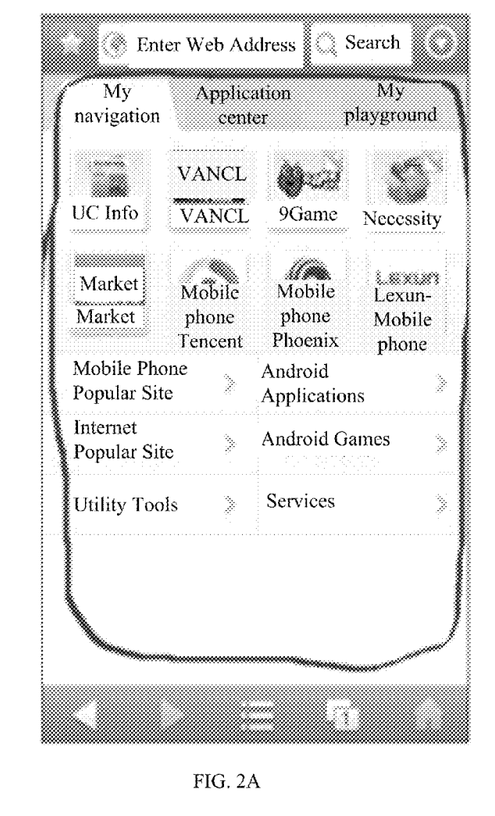
FIGS. 2A and 2B show effect pictures before and after the change of browser skin when a browser client does not use the method of the present invention.
Figure 2B:
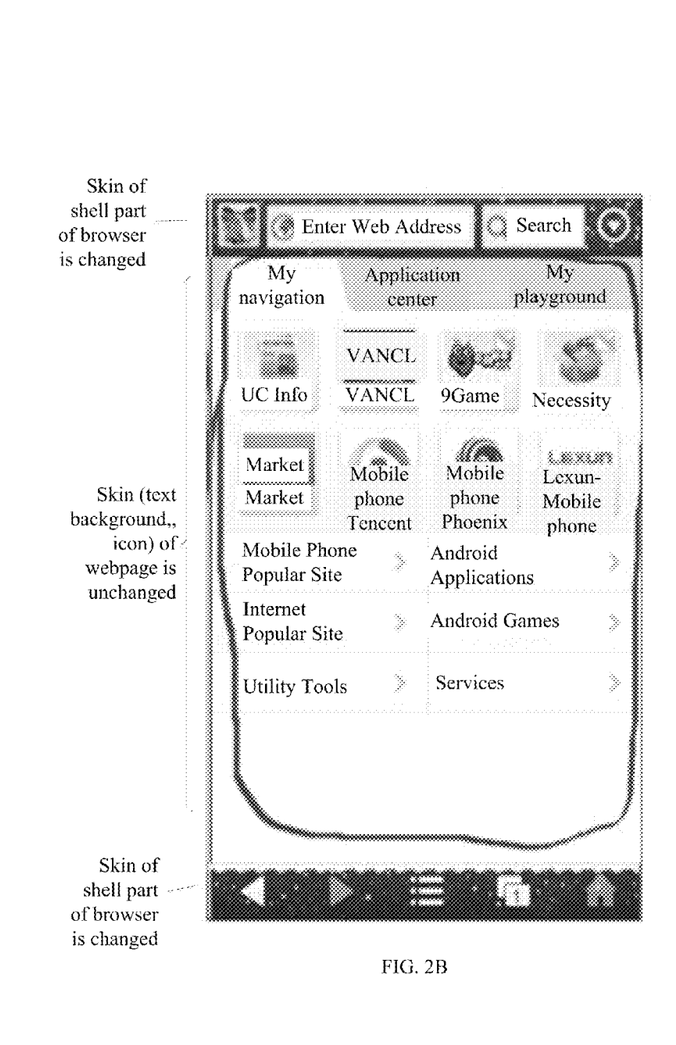

FIGS. 2A and 2B show effect pictures before and after the change of browser skin when a browser client does not use the method of the present invention. A hand-drawn circle in FIGS. 2A and 2B indicates the current webpage displayed. As shown in FIGS. 2A and 2B, after changing the skin of the browser, the skin of the current webpage displayed in the web browser does not change.

If adding uc-skin="..." to the source code of the webpage, as follows: (middle section as an example)

```
<div uc-skin="navigator.tab1"> Mobile Phone Popular Site </div>
<div uc-skin="navigator.tab2">Android Applications </div>
<div uc-skin="navigator.tab3">Internet Popular Site </div>
<div uc-skin="navigator.tab4">Android Games </div>
<div uc-skin="navigator.tab5">Utility Tools</div>
<div uc-skin="navigator.tab6">Services</div>,
```

Then, display style of the webpage is changed when the browser client switches the skin.

Figure 3A:
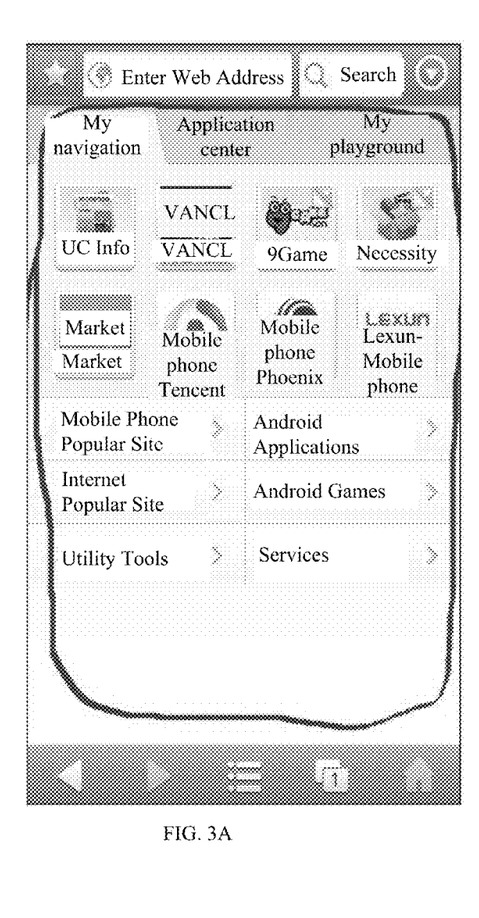
FIGS. 3A and 3B show effect pictures of the browser skin before and after switching to "Christmas Skin" when a browser client uses the method of the present invention.
Figure 3B:
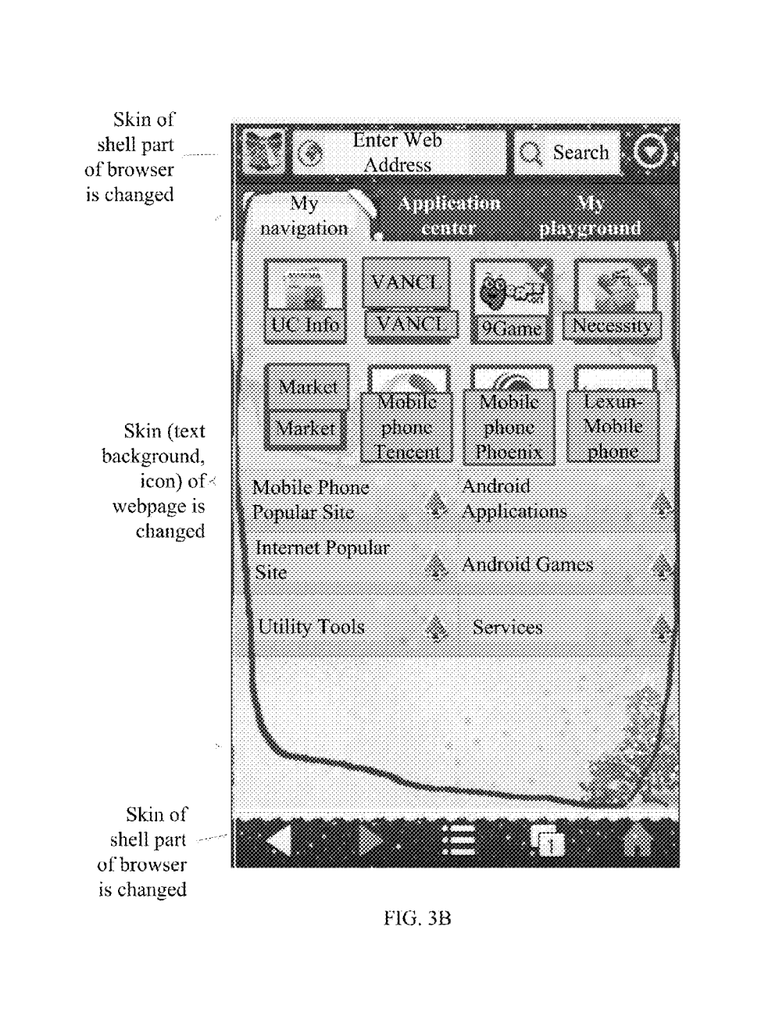
Figure 4A:
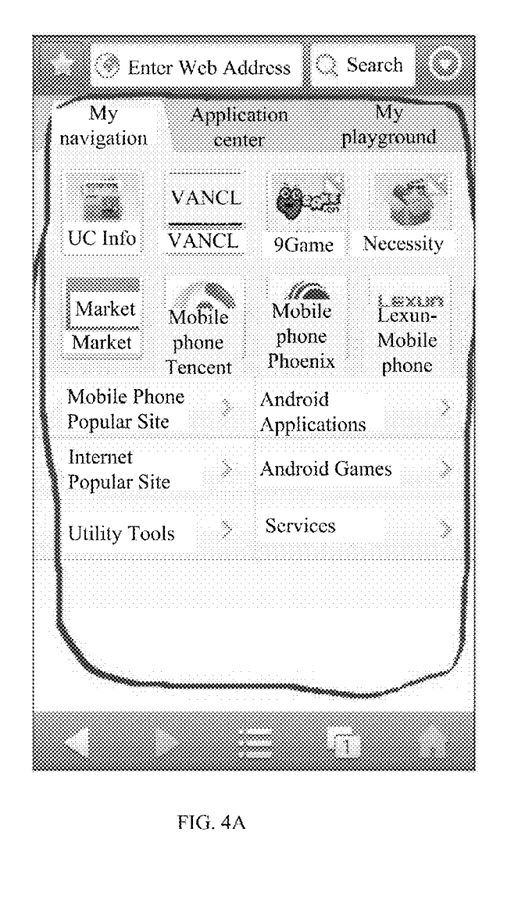
FIGS. 4A and 4B show effect pictures of the browser skin before and after switching to "Ocean Skin" when a browser client uses the method of the present invention.
Figure 4B:
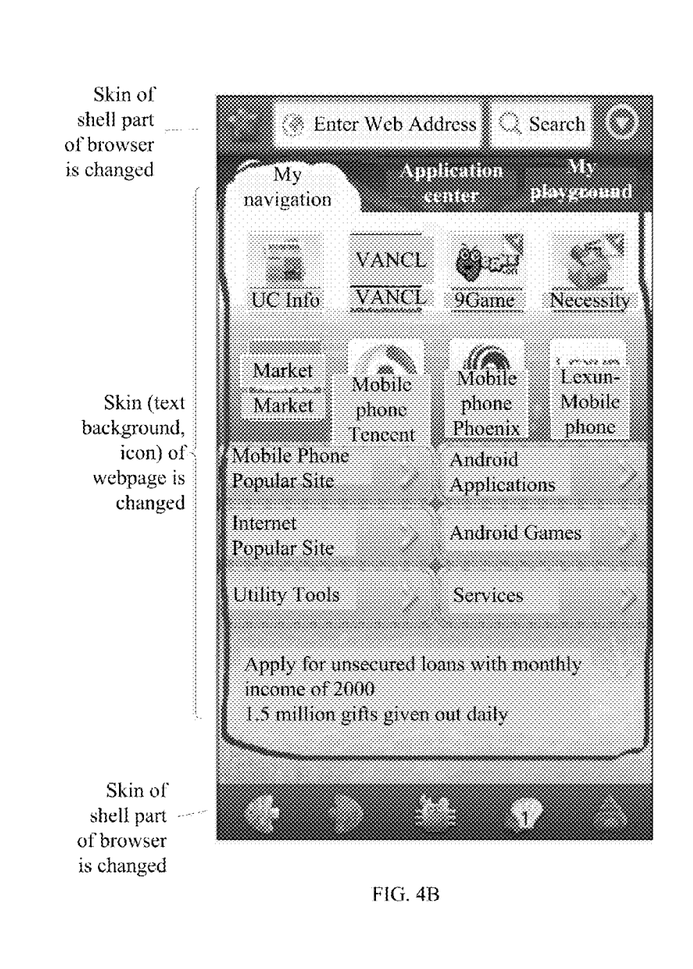

FIGS. 3A and 3B show effect pictures of the browser skin before and after switching to "Christmas Skin" when a browser client uses the method of the present invention. A hand-drawn circle in each of FIGS. 3A, 3B, 4A and 4B indicates the current webpage displayed. FIGS. 4A and 4B show effect pictures of the browser skin before and after switching to "Ocean Skin" when a browser client uses the method of the present invention.

As shown in FIGS. 3A, 3B, 4A and 4B, when a browser skin is changed, the current webpage skin displayed in the browser changes correspondingly along with the change of the browser skin.

As it can be seen from above descriptions, according to the present invention, in a skin replacement method for the webpage content area displayed on a browser of mobile terminal, because the browser client extends some self-defined CSS properties or HTML element properties and provides the corresponding skin style library, or provides an interface or a mechanism: webpage developers may be allowed to add corresponding skin style information in the skin style library of the browser client. Then, these properties are provided to the webpage developers such that, when webpage developers write the source code of the webpage content, the webpage developers can add the self-defined property information in the source code of corresponding elements. Thus, the corresponding skin style information may be found in the skin style library of the browser client based on the index information of the self-defined property information. According to this method, when the skin style information in the skin style library of the browser client is changed, the skin style information of the element in the webpage content is also changed.

Thus, the skin style information of the element in the web content can switch dynamically with the switching of the skin style information in the skin style library of the browser client, and the skin effect of the browser client can be directly and seamlessly integrated with the webpage content displayed in the browser, resulting in desired skin effect for the whole browser thus providing better use experience for users.

Particularly, with the rapid development of HTML5, web games and web applications, the technical solutions according to the invention can help web developers to design and create personalized web applications with better effect and use experience for users.

Figure 5:
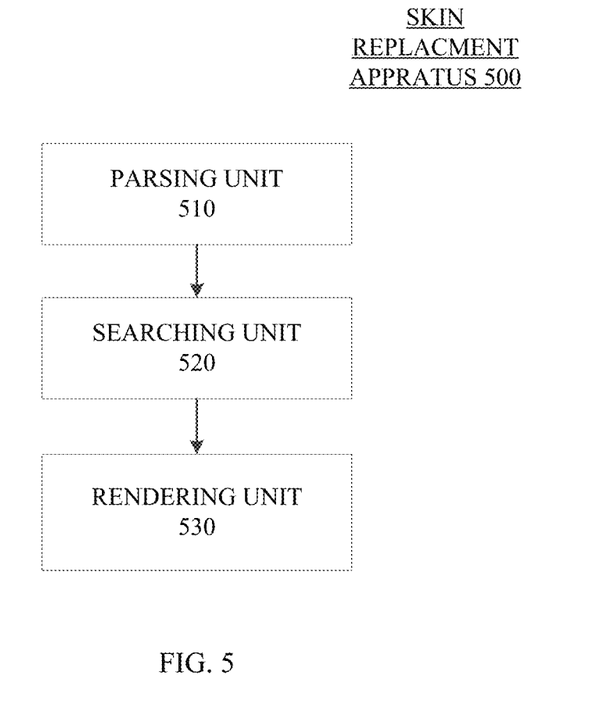
FIG. 5 shows a block diagram of a skin replacement apparatus for skin replacement of the webpage content area displayed on a browser of mobile terminal according to the present invention.

FIG. 5 shows a block diagram of a skin replacement apparatus 500 for skin replacement processing in a webpage content area displayed on a browser of mobile terminal according to the present invention.

As shown in FIG. 5, skin replacement apparatus 500 includes a parsing unit 510, a searching unit 520 and a rendering unit 530 according to the present invention.

Parsing unit 510 is configured to parse each element of the webpage content received from a web server, and to determine whether the self-defined extension property exists in an element for indicating skin style information of the element. The self-defined extension property is predefined by the browser client and provided for the web server to be added to the element when the element is created, and the value of the self-defined extension property represents the index information of the skin style information of the element in the skin style library of the browser client. As an example, the self-defined extension property is provided for the web server in a prescribed manner by the browser client to be added to the element when the element is created. For example, the self-defined extension property may be self-defined CSS property or HTML element property.

Searching unit 520 is configured to, when it is determined that the self-defined extension property exists in the element based on the index information represented by the value of the self-defined extension property, search the skin style information corresponding to the index information in the skin style library of the browser client. Rendering unit 530 is configured to render the element based on found skin style information.

Here, the skin style information corresponding to the index information may be pre-stored with associated index information in the skin style library of the browser client, or may be added to the skin style library of the browser client by webpage content writers through a special interface provided by the browser client.

If it is determined that there is no self-defined extension property or no corresponding skin style information found in the skin style library of the browser client based on the index information, rendering unit 530 is also configured to render the element based on the original style information in the webpage.

Figure 6:
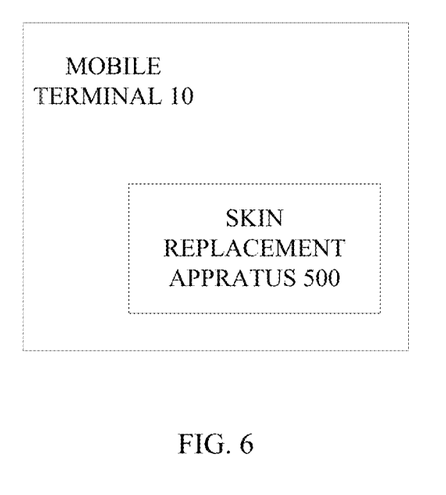
FIG. 6 shows a block diagram of a mobile terminal having skin replacement apparatus according to the present invention.

FIG. 6 shows a block diagram of mobile terminal 10 having skin replacement apparatus 500 according to the present invention. It should be noted that, as shown in FIG. 6, mobile terminal 10 may include various modifications of skin replacement apparatus 500 shown in FIG. 5.

Further, typically, the mobile terminal according to the present invention may include any appropriate terminal equipment capable of webpage browsing, such as mobile phones and personal digital assistants (PDAs), etc., and the scope of the present invention should not be limited to any specific types of mobile terminals.

In addition, the method of the present invention can also be realized in computer programs executed by the CPU. When the computer programs are executed by the CPU, the above described functionalities defined in the method of the present invention can be performed.

In addition, the above method steps and system units can be realized by a controller (e.g., a processor) and a computer-readable storage medium storing computer programs capable of making the controller or processor to realize the above method steps or system units.

In addition, it should be noted that the described computer-readable storage media (e.g., memory) may be volatile memory or non-volatile memory, or may include volatile memory and nonvolatile memory. As a non-limiting example, nonvolatile memory can include read-only memory (ROM), programmable ROM (PROM), erasable programmable ROM (EPROM), electrically erasable programmable ROM (EEPROM), or flash memory. Volatile memory may include random-access memory (RAM) and the RAM may be used as external cache memory. As a non-limiting example, RAM can be produced in various forms such as synchronous RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). It is intended that the disclosed storage media include but not limited to these and other suitable types of memory.

Those skilled in the art understand that the disclosed various exemplary logic blocks, modules, circuits and algorithm steps can be implemented in electronic hardware, computer software or a combination thereof. In order to clearly illustrate the interchangeability between the hardware and software, the functions of the various exemplary components, blocks, modules, circuits and algorithm steps have been generally described. Whether the functions are implemented in hardware or software depends on the specific application and the design limitation imposed on the entire system. Those skilled in the art can use a variety of ways to realize the described functionalities for each specific application. However, such realization decision should not be interpreted as departing from the scope of the present invention.

The various illustrative logic blocks, modules, and circuits described herein can be designed using the following components performing the disclosed functionalities: general-purpose processor, digital signal processor (DSP), application specific integrated circuits (ASICs), field programmable gate array (FPGA) or other programmable logic device, discrete gate or transistor logic, discrete hardware components, or any combination of these components. The general-purpose processor can be a microprocessor or, alternatively, the processor can be any conventional processor, controller, microcontroller or state machine. The processor can also be a combination of computing devices, such as a combination of DSP and microprocessors, multiple microprocessors, one or more microprocessors integrated with a DSP core, or any other such configurations.

The disclosed methods or algorithm steps may be embodied in hardware directly, in software modules executed by the processor, or in a combination of both. The software modules can reside in RAM memory, flash memory, ROM memory, EPROM memory, EEPROM memory, registers, hard disk, removable disk, the CD-ROM, or any other form of storage medium known in the field. The storage medium can be coupled to the processor, such that the processor can read information from the storage medium and write information to the storage medium. Alternatively, the storage medium can be integrated with the processor. The processor and the storage medium may reside in an ASIC. The ASIC can reside in the user terminal. Also alternatively, the processor and the storage medium may reside as discrete components in the user terminal.

Although the method and apparatus for skin replacement processing for webpage content area displayed in the browser of the mobile terminal according to the present invention have been described together with the accompanying drawings in illustrative ways, those skilled in the art understand that various improvements can be made to the above described method and apparatus for skin replacement processing for webpage content area displayed in the browser of the mobile terminal according to the present invention, without departing from the contents of the present invention. Therefore, the scope of the present invention should be defined by the attached claims.

The invention claimed is:

1. A skin replacement method for skin replacement process of a webpage content area displayed in a browser of a mobile terminal, comprising:
   defining, by a browser client, a self-defined Cascading Style Sheet (CSS) property or a self-defined Hypertext Markup Language (HTML) element property via extending CSS properties or HTML element properties;
   storing a skin style library on a browser client, the skin style library containing skin style information that corresponds to one or more skin effects, respectively, wherein the skin style information that corresponds to each skin effect of the one or more skin effects is associated with one or more indexes, respectively;
   during creating of webpage content of a webpage, adding, by a webpage content writer, the self-defined CSS property or the self-defined HTML element property to an element in the webpage content, wherein a value of the self-defined CSS property or of the self-defined HTML element property represents an index for the skin style information of the element in the skin style library;
   after a skin effect of the one or more skin effects is selected by a user of the browser client, when the user of the browser client requests the webpage, parsing the webpage content received from a web server, to find the self-defined CSS property or the self-defined HTML element property in the element in the webpage content;
   according to the value of the CSS property or of the self-defined HTML element property, searching in the skin style library on the browser client, to find the skin style information corresponding to the index and the selected skin effect; and
   rendering the element in the webpage content using the found skin styles,
   wherein the skin style library is edited by at least one of the browser client and the webpage content writer, and the user of the browser client does not directly edit the skin style library,
   wherein: a skin effect of the one or more skin effects includes specified skin style associated with the one or more indexes and specified style of a browser skin, wherein the browser skin includes skins of one or more user interface widgets in a shell part of the browser client, and
   the method further comprises switching to another skin effect of the one or more skin effects, including:
      in the skin style library on the browser client, finding a second skin style information corresponding to the another skin effect and based on the index for the element;
      rendering the element in the webpage content using the found second skin style information; and changing the browser skin to a second specified skin style corresponding to the another skin effect, such that the another skin effect in the shell part of the browser client is directly and seamlessly integrated with the element in the webpage content displayed in the browser.

2. The method according to claim 1, wherein, before adding the self-defined CSS property or the self-defined HTML element property to the element, the method further includes:
providing, by the browser client, the self-defined CSS property or the self-defined HTML element property to a web server, to be added to source code of the element during the creating of the webpage content; and
receiving, by the browser client, the source code of the element from the web server.

3. The method according to claim 1, wherein the storing of the skin style library further includes:
adding skin style information corresponding to a skin effect of the one or more skin effects to the skin style library of the browser client by the webpage content writer through a special interface provided by the browser client using at least one of a configuration file and an XML file.

4. The method according to claim 1, wherein the webpage content includes a plurality of elements, the self-defined CSS property or the self-defined HTML element property exists in source code of each element of the plurality of elements, and has a value respectively corresponding to the each element, such that the browser client displays the plurality of elements with the selected skin effect.

5. The method according to claim 1, wherein source code of the element includes:
a start tag of the element, wherein the start tag sequentially includes therein a tag name of the start tag, an HTML style attribute, the self-defined CSS property, and the value of the self-defined CSS property; or
sequentially, a style start tag, a selector corresponding to the element, the self-defined CSS property, the value of the self-defined CSS property, and a style end tag corresponding to the style start tag.

6. The method according to claim 1, wherein source code of the element includes:
a start tag of the element, wherein the start tag sequentially includes therein a tag name of the start tag, the self-defined HTML element property, and the value of the self-defined HTML element property.

7. The method according to claim 1, wherein the self-defined CSS property or the self-defined HTML element property includes a text string 'skin' or a text string 'uc'.

8. A non-transitory computer-readable storage medium containing executable computer programs, when executed by a computer, performing a skin replacement method for skin replacement process of a webpage content area displayed in a browser of a mobile terminal, the method comprising:
defining, by a browser client, a self-defined Cascading Style Sheet (CSS) property or a self-defined Hypertext Markup Language (HTML) element property via extending CSS properties or HTML element properties;
storing a skin style library on a browser client, the skin style library containing skin style information that corresponds to one or more skin effects, respectively, wherein the skin style information that corresponds to each skin effect of the one or more skin effects is associated with one or more indexes, respectively;
during creating of webpage content of a webpage, adding, by a webpage content writer, the self-defined CSS property or the self-defined HTML element property to an element in the webpage content, wherein a value of the self-defined CSS property or of the self-defined HTML element property represents an index for the skin style information of the element in the skin style library;
after a skin effect of the one or more skin effects is selected by a user of the browser client, when the user of the browser client requests the webpage, parsing the webpage content received from a web server, to find the self-defined CSS property or the self-defined HTML element property in the element in the webpage content;
according to the value of the CSS property or of the self-defined HTML element property, searching in the skin style library on the browser client, to find the skin style information corresponding to the index and the selected skin effect; and
rendering the element in the webpage content using the found skin styles,
wherein the skin style library is edited by at least one of the browser client and the webpage content writer, and the user of the browser client does not directly edit the skin style library,
wherein: a skin effect of the one or more skin effects includes specified skin style associated with the one or more indexes and specified style of a browser skin, wherein the browser skin includes skins of one or more user interface widgets in a shell part of the browser client, and
the method further comprises switching to another skin effect of the one or more skin effects, including:
in the skin style library on the browser client, finding a second skin style information corresponding to the another skin effect and based on the index for the element;
rendering the element in the webpage content using the found second skin style information; and
changing the browser skin to a second specified skin style corresponding to the another skin effect, such that the another skin effect in the shell part of the browser client is directly and seamlessly integrated with the element in the webpage content displayed in the browser.

9. The non-transitory computer-readable storage medium according to claim 8, wherein, before adding the self-defined CSS property or the self-defined HTML element property to the element, the method further includes:
providing, by the browser client, the self-defined CSS property or the self-defined HTML element property to a web server, to be added to the source code of the element during the creating of the webpage content; and
receiving, by the browser client, the source code of the element from the web server.

10. The non-transitory computer-readable storage medium according to claim 8, wherein the storing of the skin style library further includes:
adding skin style information corresponding to a skin effect of the one or more skin effects to the skin style library of the browser client by the webpage content writer through a special interface provided by the browser client using at least one of a configuration file and an XML file.

11. The non-transitory computer-readable storage medium according to claim 8, wherein the webpage content includes a plurality of elements, the self-defined CSS property or the self-defined HTML element property exists in source code of each element of the plurality of elements, and has a value respectively corresponding to the each element, such that the browser client displays the plurality of elements with the selected skin effect.

12. The non-transitory computer-readable storage medium according to claim 8, wherein source code of the element includes:
 a start tag of the element, wherein the start tag sequentially includes therein a tag name of the start tag, an HTML style attribute, the self-defined CSS property, and the value of the self-defined CSS property; or
 sequentially, a style start tag, a selector corresponding to the element, the self-defined CSS property, the value of the self-defined CSS property, and a style end tag corresponding to the style start tag.

13. A mobile terminal, comprising a processor and a memory unit, and having computer programs thereon, wherein the computer programs cause the mobile terminal to perform a skin replacement method for skin replacement process of a webpage content area displayed in a browser of the mobile terminal, the method comprising:
 defining, by a browser client, a self-defined Cascading Style Sheet (CSS) property or a self-defined Hypertext Markup Language (HTML) element property via extending CSS properties or HTML element properties;
 storing a skin style library on a browser client, the skin style library containing skin style information that corresponds to one or more skin effects, respectively, wherein the skin style information that corresponds to each skin effect of the one or more skin effects is associated with one or more indexes, respectively;
 during creating of webpage content of a webpage, adding, by a webpage content writer, the self-defined CSS property or the self-defined HTML element property to an element in the webpage content, wherein a value of the self-defined CSS property or of the self-defined HTML element property represents an index for the skin style information of the element in the skin style library;
 after a skin effect of the one or more skin effects is selected by a user of the browser client, when the user of the browser client requests the webpage, parsing the webpage content received from a web server, to find the self-defined CSS property or the self-defined HTML element property in the element in the webpage content;
 according to the value of the CSS property or of the self-defined HTML element property, searching in the skin style library on the browser client, to find the skin style information corresponding to the index and the selected skin effect; and
 rendering the element in the webpage content using the found skin styles,
 wherein the skin style library is edited by at least one of the browser client and the webpage content writer, and the user of the browser client does not directly edit the skin style library,
 wherein: a skin effect of the one or more skin effects includes specified skin style associated with the one or more indexes and specified style of a browser skin, wherein the browser skin includes skins of one or more user interface widgets in a shell part of the browser client, and
 the method further comprises switching to another skin effect of the one or more skin effects, including:
  in the skin style library on the browser client, finding a second skin style information corresponding to the another skin effect and based on the index for the element;
  rendering the element in the webpage content using the found second skin style information; and
  changing the browser skin to a second specified skin style corresponding to the another skin effect, such that the another skin effect in the shell part of the browser client is directly and seamlessly integrated with the element in the webpage content displayed in the browser.

14. The mobile terminal according to claim 13, wherein, before adding the self-defined CSS property or the self-defined HTML element property to the element, the method further includes:
 providing, by the browser client, the self-defined CSS property or the self-defined HTML element property to a web server, to be added to the source code of the element during the creating of the webpage content; and
 receiving, by the browser client, the source code of the element from the web server.

15. The mobile terminal according to claim 13, wherein the storing of the skin style library further includes:
 adding skin style information corresponding to a skin effect of the one or more skin effects to the skin style library of the browser client by the webpage content writer through a special interface provided by the browser client using at least one of a configuration file and an XML file.

16. The mobile terminal according to claim 13, wherein the webpage content includes a plurality of elements, the self-defined CSS property or the self-defined HTML element property exists in source code of each element of the plurality of elements, and has a value respectively corresponding to the each element, such that the browser client displays the plurality of elements with the selected skin effect.

17. The mobile terminal according to claim 13, wherein source code of the element includes:
 a start tag of the element, wherein the start tag sequentially includes therein a tag name of the start tag, an HTML style attribute, the self-defined CSS property, and the value of the self-defined CSS property; or
 sequentially, a style start tag, a selector corresponding to the element, the self-defined CSS property, the value of the self-defined CSS property, and a style end tag corresponding to the style start tag.

\* \* \* \* \*